Figure 1:
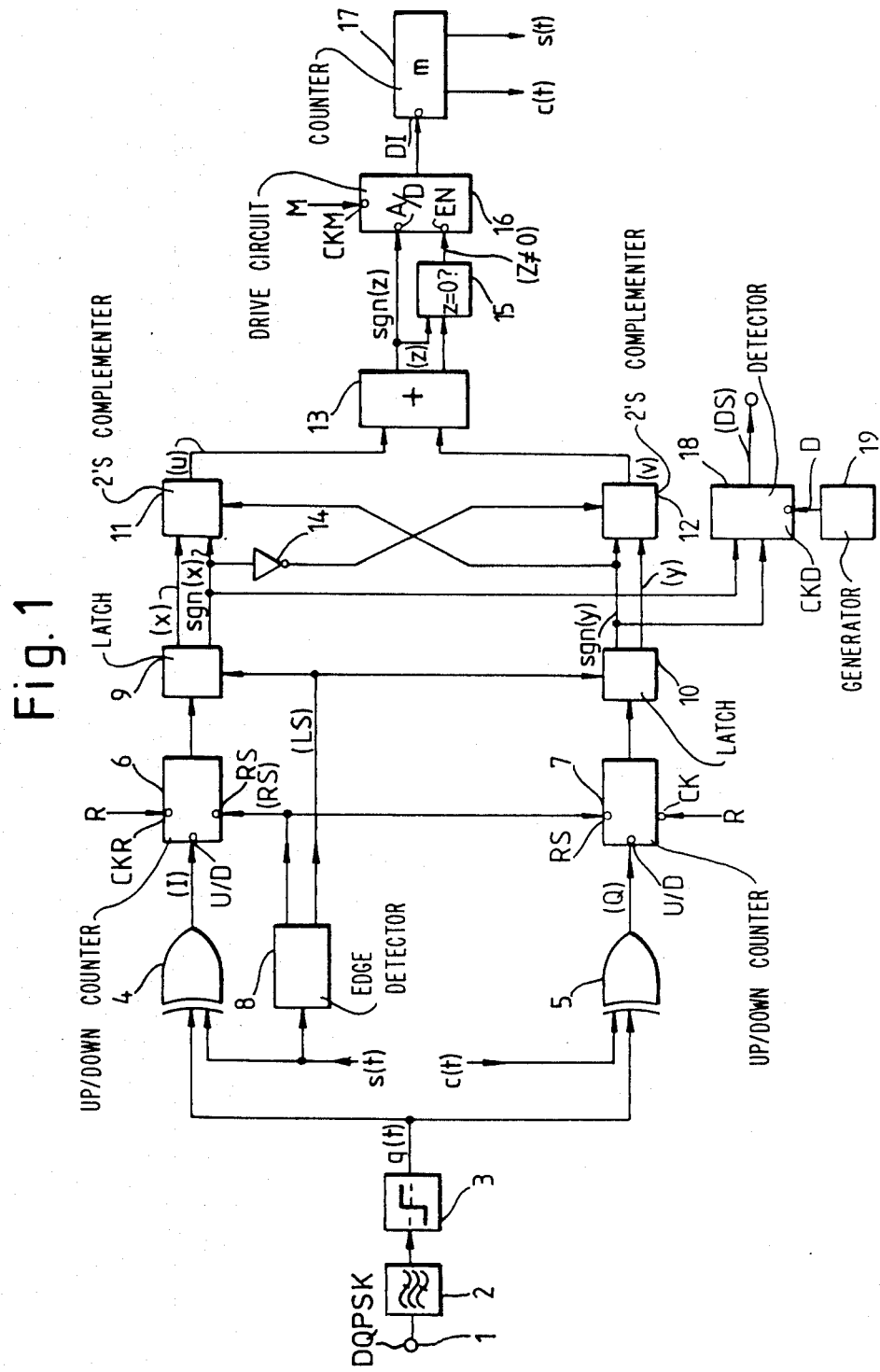

United States Patent [19]

Sharpe

[11] Patent Number: 4,859,959

[45] Date of Patent: Aug. 22, 1989

[54] DATA DEMODULATOR CARRIER PHASE ERROR DETECTOR

[75] Inventor: Robin Sharpe, Morden, England

[73] Assignee: U.S. Philips Corporation, New York, N.Y.

[21] Appl. No.: 280,615

[22] Filed: Dec. 5, 1988

[30] Foreign Application Priority Data

Dec. 11, 1987 [GB] United Kingdom ............... 8729016

[51] Int. Cl.$^4$ ................. H03D 3/18; H03K 9/04
[52] U.S. Cl. ................... 329/124; 329/50; 329/107; 329/126
[58] Field of Search ............ 329/50, 104, 107, 110, 329/122, 124, 126; 375/80, 81, 82, 83, 84, 85, 86, 87, 94, 95, 97, 120; 455/214, 337

[56] References Cited

U.S. PATENT DOCUMENTS

| | | | |
|---|---|---|---|
| 3,729,684 | 4/1973 | Shuda | 329/104 |
| 3,971,996 | 7/1976 | Motley et al. | 328/155 |
| 4,359,692 | 11/1982 | Ryan | 329/50 |
| 4,555,667 | 11/1985 | Cressey et al. | 329/50 |

FOREIGN PATENT DOCUMENTS 0109332 10/1983 France.

OTHER PUBLICATIONS

Lindsey & Chie, A Survey of Digital Phase-Locked Loops, Proceedings of the IEEE, vol. 69, No. 4, Apr. 1981.

Primary Examiner—David Mis
Attorney, Agent, or Firm—David R. Treacy

[57] ABSTRACT

An arrangement for producing a phase error signal representing the phase error between a received phase-modulated signal and a locally generated carrier signal. The arrangement comprises two exclusive-OR gates (4) and (5) to which the received signal q(t) and sine and cosine versions s(t) and c(t) of the carrier signal are applied. The outputs of the two gates (4) and (5) control according to their level (high or low), the up/down counts of respective up/down counters (6) and (7). These counts are latched periodically by latches (9) and (10) and the latched values are modified in 2's complementers (11) and (12) and then summed in a binary adder (13) to produce a resultant phase error signal (z).

6 Claims, 2 Drawing Sheets

DATA DEMODULATOR CARRIER PHASE ERROR DETECTOR

This invention relates to coherent data demodulators for the demodulation of shift keyed signals which are phase-modulated to represent multi-bit data symbols.

The invention relates more particularly to such coherent data demodulators of a type in which in the demodulation process two quadrature phased channel signals are produced by separately multiplying together an incoming shift keyed signal of a given carrier frequency and each of two quadrature phased versions of a locally generated carrier signal of notionally the same frequency as said carrier frequency, digital data being thereafter detected from either the incoming shift keyed signal or from either one of the two channel signals by determining the occurrence of data transitions.

In order to achieve reliable data detection, both the locally generated carrier signal and a locally generated baud rate data clock are required to be continuously adjusted into coherent phase relationship with the incoming shift keyed signal and this adjustment can be accomplished by using digital phase-locked loops (DPLL). A single DPLL can be used for both those adjustments, or they can be carried out using separate DPLL's in a carrier recovery circuit and a data recovery circuit, respectively.

The article "A survey of Digital Phase-Locked Loops", published in Proceedings of the IEEE, Vol. 69, No. 4, April 1981, gives useful information on the state of the art.

A problem encountered in the implementation of coherent data demodulators of the above type is to be able to make a phase detection, which is used in the adjustment of the phase of the locally generated carrier signal, insensitive to variation of phase due to phase-modulated data superimposed on the carrier signal. This problem was found to occur even when a separate DPLL is used to recover the phase of the carrier signal from the incoming shift keyed signal.

Applicants GB patent application No. 8729017, describes an arrangement for locking the phase of a locally generated carrier signal to the phase of an incoming shift keyed signal in a data demodulator of the type set forth above in order to mitigate this problem. This arrangement comprises input means for receiving a phase-modulated shift keyed signal of said given carrier frequency; reference signal generator means for producing two quadrature phased versions of said locally generated carrier signal; multiplier means connected to receive said shift keyed signal and said two locally generated carrier signal versions and operable to multiply separately the shift keyed signal with each of said carrier signal versions to produce two bi-level channel signals; measuring means connected to receive said two channel signals and operable in respect of each to produce for in each period thereof occurring in each successive half cycle of one of the channel signals a first signal representing the difference, if any, in the durations of the two levels of the channel signal in the period and a second signal representing which is the predominant level; logic means connected to receive both said first signals and both said second signals and operable to produce an error signal representing the algebraic sum of said first signals by subtracting the first signal for one channel signal from the first signal for the other channel signal when the second signals for both channel signals represent the same predominant level, or subtracting the first signal for the other channel signal from the first signal for said one channel signal when the second signals for both channel signals represent opposite levels; and phase adjusting means connected to receive said error signal and operable to cause the reference signal generator means to advance the phase of said locally generated carrier signal when said error signal has a value of one sign and to retard the phase of said locally generated carrier signal when said error signal has a value of the opposite sign.

It is an object of the present invention to provide a simple and efficient implementation of the multiplier, measuring and logic means for the production of the resultant phase error signal.

According to the present invention an arrangement for producing a phase error signal representative of the phase error between a received phase-modulated shift keyed signal of a given frequency and a locally generated carrier signal of notionally the same frequency comprises, two exclusive-OR gates connected to receive in common at respective first inputs a square wave version of the received signal and at respective second inputs respective quadrature phased versions of square wave form of said locally generated carrier signal, two up/down counters, the up/down operation mode of each of which is controlled by the output signal from a respective one of said two exclusive-OR gates, each of said counters being connected to receive counting pulses from a count clock pulse source and each being reset by a reset signal on the occurrence of each edge of one of the two locally generated carrier signals, the count present on each counter immediately before being reset each time representing the difference in the durations of the two levels of the relevant channel signal and the direction of the count (up and down) representing the sign of said difference, the arrangement further comprising logic means responsive to the count produced by both counters to produce said phase error signal.

In carrying out the invention each counter is preferably a binary counter and the logic means comprises two latching means into which the counts on the counters are latched, respectively, before the counters are reset, which latching means are connected to extend the counts therein via respective 2s complementers to a binary adder, each latching means also providing a bi-level sign signal which signifies the sign of the count currently latched therein and which is applied, one with level inversion, to the complementer associated with the other latching means, the complementers functioning in response to only one of the two possible levels of the applied sign signal. Each sign signal can be the most significant bit of the relevant latched count.

Figure 2:
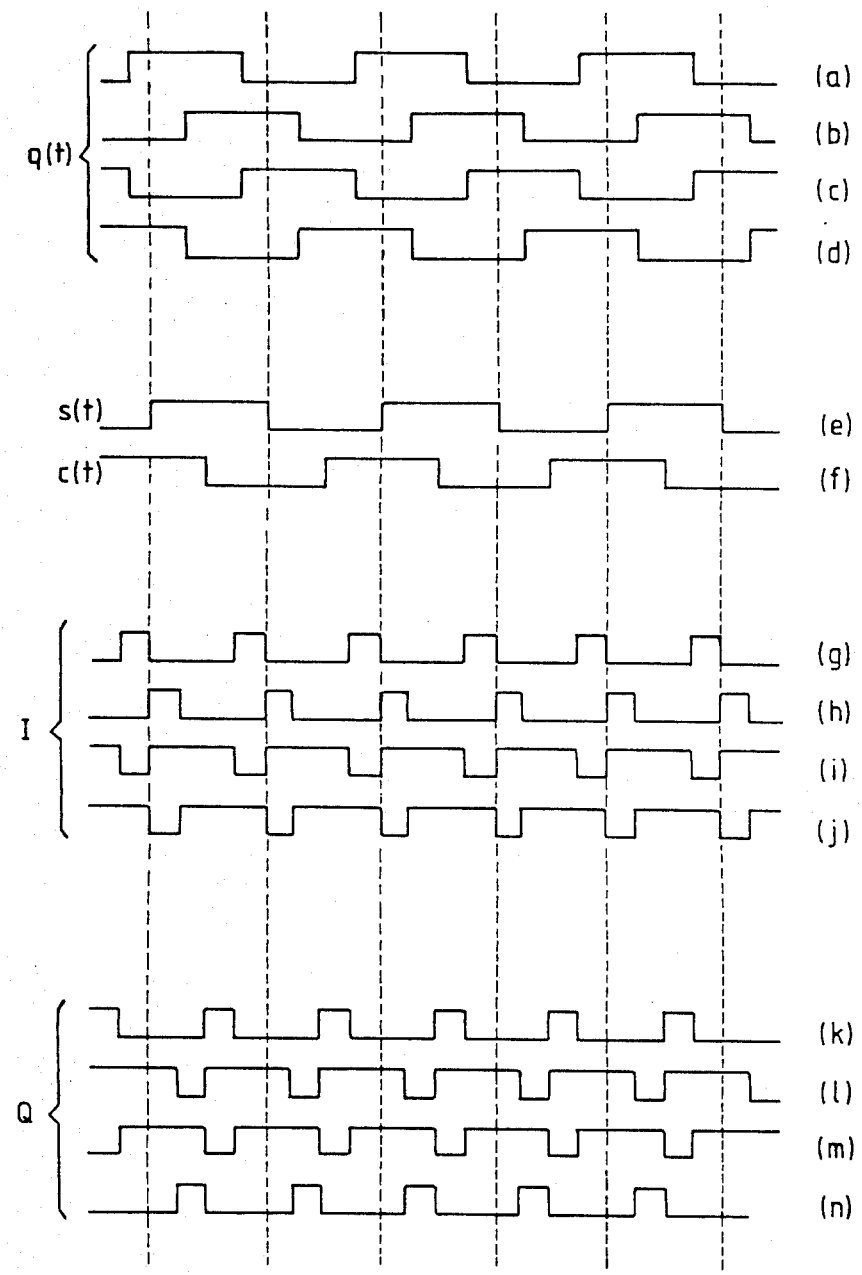

In order that the invention may be more fully understood reference will now be made by way of example to the accompanying, drawings of which:

FIG. 1 shows a block diagram of a coherent data demodulator embodying an arrangement for producing a phase error signal in accordance with the present invention; and FIG. 2 sows an explanatory waveform diagram.

Referring to the drawings, the coherent data demodulator shown in FIG. 1 has an input terminal 1 to which an incoming phase shift keyed signal is applied. For the purposes of the present description it is assumed that this incoming signal is a DQPSK signal, that is a quadrature phase shift keyed signal which has been produced by differential encoding of data bits of a data stream. The encoding employed is suitably in accordance with the CCITT Recommendation V22 which specifies inter alia that for a data stream of 1200 bits per second the data stream to be transmitted shall be divided into symbols S of 2 consecutive bits (dibits). Each symbol shall be encoded as a phase change relative to the phase of the preceding symbol as set forth in the Table 1 below.

TABLE I

| Symbol(S) values (1200 bits/s) | Phase Change |
|---|---|
| 00 | +90° |
| 01 | 0° |
| 11 | +270° |
| 10 | +180° |

The incoming DQPSK signal at the input terminal 1 is applied to a receive filter 2 which subjects this incoming signal to equivalent baseband pulse shaping and delay equalization. This receive filter 2 can be a high order active filter of known form. The output signal from the filter 2 is hard limited by a limiter 3 which produces a resultant phase shift keyed signal q(t) which can be approximated by the equation:

$$q(t) = ssq(\omega_c t + \phi_i) \quad (1)$$

where ssq signifies a square wave and $\phi_i = \theta + n\pi/2$, with each value of n being equally likely in the case of random DQPSK, where n=0, 1, 2, 3.

The resultant signal q(t) is applied to first input of each of two exclusive-OR gates 4 and 5, and two reference signals s(t) and c(t) are applied respectively to second inputs of the gates 4 and 5. These two reference signals are generated by a reference signal generator, as will be described, and can be represented by the equations:

$$s(t) = ssq(\omega_c t) \quad (2)$$

$$c(t) = csq(\omega_c t) \quad (3)$$

where ssq and csq signify square wave sine and cosine phased versions, respectively, of the locally generated carrier signal of frequency $\omega_c$.

The instantaneous resultant signal q(t) from the limiter 3 can have any one of four different phases dependent on the dibit value which it represents at any time. Waveform diagrams (a), (b), (c) and (d) in FIG. 2 represent these four possible phases, respectively, and the two reference signals s(t) and c(t) are represented by the waveform diagrams (e) and (f).

The two gates 4 and 5 function as multipliers and produce respective channel signals (I) and (Q) which, ignoring the double frequency components produced by the multiplications, can be represented by the equations:

$$(I) = ssq(\phi_i + \theta) \quad (4)$$

$$(Q) = csq(\phi_i + \theta) \quad (5)$$

where $\theta$ is an arbitrary carrier phase error.

In FIG. 2, waveform diagrams (g), (h), (i) and (j) represent the four possible bi-level forms of the channel signal (I) and waveform diagrams (k), (l), (m) and (n) represent the four possible bi-level forms of the channel signal (Q).

One level of a channel signal corresponds to a positive phase difference of the signal q(t) relative to the reference signal s(t) or c(t), as the case may be, and the other level corresponds to a negative phase difference. These channel signals (I) and (Q) contain phase error information and are applied to the up/down control input U/D of respective up/down counters 6 and 7 which are driven by counting pulses R from a count pulse clock source (not shown) for instance of a frequency of 150 KHz when a carrier frequency of 2400 Hz is used. The clock pulses are applied to a clock input CKR of each of these counters. Respective reset inputs RS for the counters 6 and 7 are connected in common to the output of an edge detector 8 which has its input connected to receive the reference signal s(t) and is operable to produce at its output a reset signal (RS) to reset the counters 6 and 7 in response to each edge of the reference signal s(t).

An incoming DQPSK signal will result in the signal q(t) having a random succession of the four different phases represented by the waveform diagrams (a), (b), (c) and (d) of FIG. 2, depending on the dibit values used to modulate the DQPSK signal. Thus, the counters 6 and 7 undergo corresponding up/down counts. At each edge of the reference signal s(t), the numbers in the counters 6 and 7 are latched into respective latches 9 and 10 in response to a latching signal (LS) from the edge detector 8. The values at any time of these latched numbers are due not only to the phase (frequency) difference of the signal q(t) relative to the reference signals s(t) and c(t), but also to the quad-phased data in the DQPSK signal. Therefore, it is not feasible to use these numbers directly as a measure of the instantaneous phase difference between the signal q(t) and the reference signals s(t) and c(t), in order to carry out a phase correction for locking the phase of the reference signal generator from which the reference signals are derived to the phase of the incoming DQPSK signal.

Further processing of these latched numbers is carried out as follows. A signal (x) representing the value of the number in the latch 9, and a signal sgn (x) representing the sign(+ or −) of this number are applied to a first 2's complementer circuit 11. Similarly, a signal (y) representing the value of the number in the latch 10 and a signal sgn (y) representing the sign (+ or −) of this number are applied to a second 2's complementer circuit 12. The circuit 11 is controlled by the signal sgn (y) and the circuit 12 is controlled by the signal sgn (x). Output signals (u) and (v) of the circuits 11 and 12 are added in an adder circuit 3 to produce a resultant phase error signal (z). The circuits 11, 12 and 13 function according to the following algorithm to produce the signal (z).

(u):=(x)
(v):=(y)
if (x)<0, then (v):=(−y)
if (y)<0, then (u):=(−x)
and (z)=(u)−(v)

Because the adder circuit 13 in effect performs a subtraction process, the signal sgn (x) is inverted by an inverter 14 in its control of the 2's complementer circuit 12. The error signal (z) is quadrature insensitive in that it takes no account of quad-phase data and is in 2's complement form.

The error signal (z) is applied to a digital reference signal generator which produces the reference signals s(t) and c(t).

This reference signal generator comprises a decision circuit 15, a drive circuit 16 which is connected to receive clock pulses M from a drive pulse clock source (not shown), which pulses are applied to a clock input CKM, and an m-stage Johnson Counter 17 which is driven by the circuit 16. The decision circuit 15 is responsive to the signal (z) to provide a first output signal(z≠0) when the value of the signal (z) is not zero, and a second output signal sgn (z) representing the sign (+ or −) of the signal (z) is produced directly from the adder circuit 13. These first and second output signals are applied to the drive circuit 16. When the signal (z) is zero, neither of these two output signals is produced and the drive circuit 16 drives the counter 17 directly with drive pulses corresponding to the clock pulses M and applied to a drive input DI thereof, so that the phase of the reference signals s(t) and c(t) remains unchanged. When the signal (z) is not zero, the output signal (z/=0) is applied to an "enable" input EN and the output signal sgn (z) is applied to an "add/delete" input A/D of the circuit 16. The result is that the drive circuit 16 will add drive pulses to (when sgn (z)=+) or delete drive pulses from (when sgn (z)=−) those applied to the counter 9 to alter the rate of the drive pulses applied to the counter 9 and thereby advance or retard the phase of the reference signals s(t) and c(t).

The sign signals sgn (x) and sgn (y) each contain information as to each phase change in the signal q(t), which information is the baseband data used to modulate the incoming signal DQPSK. Also, the baud rate of this baseband data is represented by the transitions in the signals sgn (x) and sgn (y). A circuit arrangement represented by the rectangle 18 is connected to receive the signals sgn (x) and sgn (y) and is operable to detect the data transitions in these signals and to provide a resultant data output signal (DS). The circuit arrangement 18 comprises a differential decoder and bit serialiser and is driven by data clock pulses D which are applied to a clock pulse input CKD thereof from a data clock pulse generator 19. The pulse generator 19 includes a baud rate recovery circuit for phase-locking the clock pulses D with the incoming data symbols. These circuit elements of the circuit arrangement 18 and the data clock pulse generator 19 can be of any known form.

From reading the present disclosure, other modifications will be apparent to persons skilled in the art. Such modifications may involve other features which are already known per se and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly or any generalisation or modification thereof which would be apparent to persons skilled in the art, whether or not it relates to the same invention as presently claimed in any claim and whether or not it mitigates any or all of the same technical problems as does the present invention. The applicants hereby reserve the right to formulate new claims to such features and/or combinations of such features during the prosecution of the present application or of any further application derived therefrom.

I claim:

1. An arrangement for producing a phase error signal representative of the phase error between a received phase-modulated shift keyed signal of a given frequency and a locally generated carrier signal of notionally the same frequency, which arrangement is characterised by comprising two exclusive-OR gates connected to receive in common at respective first inputs a square wave version of the received signal and at respective second inputs respective quadrature phase versions of square wave form of said locally generated carrier signal, two up/down counters, the up/down operation mode of each of which is controlled by the output signal from a respective one of said two exclusive-OR gates, each of said counters being connected to receive counting pulses from a count clock pulse source and each being reset by a reset signal on the occurrence of each edge of one of the two locally generated carrier signals, the count present on each counter immediately before being reset each time representing the difference in the durations of the two levels of the relevant channel signal and the direction of the count representing the sign of said difference, the arrangement further comprising logic means responsive to the count produced by both counters to produce said phase error signal.

2. An arrangement as claimed in claim 1, characterised in that each of said counters is a binary counter and the logic means comprises two latching means into which the counts on the counters are latched, respectively, before the counters are reset, which latching means are connected to extend the counts therein via respective 2's complementers to a binary adder, each latching means also providing a bi-level sign signal which signifies the sign of the count currently latched therein and which is applied, one with level inversion, to the 2's complementer associated with the other latching means, the 2's complementers functioning in response to only one of the two possible levels of the applied sign signal.

3. An arrangement as claimed in claim 2, characterised in that each sign signal is the most significant bit of the relevant latched count.

4. A coherent data demodulator for the demodulation of shift keyed signals which are phase-modulated to represent multi-bit data symbols, said demodulator including an arrangement for producing a phase error signal representative of the phase error between a received phase-modulated shift keyed signal of a given frequency and a locally generated carrier signal of notionally the same frequency, said arrangement being characterized by comprising two exclusive-OR gates connected to receive in common at respective first inputs a square wave version of the received signal and at respective second inputs respective quandrature phase versions of square wave form of said locally generated carrier signal, two up/down counters, the up/down operation mode of each of which is controlled by the output signal from a respective one of said two exclusive-OR gates, each of said counters being connected to receive counting pulses from a count clock pulse source and each being reset by a reset signal on the occurrence of each edge of one of the two locally generated carrier signals, the count present on each counter immediately before being reset each time representing the difference in the durations of the two levels of the relevant channel signal and the direction of the count representing the sign of said difference, the arrangement further comprising logic means responsive to the count produced by both counters to produce said phase error signal.

5. A demodulator as claimed in claim 4 characterized in that each of said counters is a binary counter and the logic means comprises two latching means into which the counts on the counters are latched, respectively, before the counters are reset, which latching means are connected to extend the counts therein via respective 2's complementers to a binary adder, each latching means also providing a bi-level sign signal which signifies the sign of the count currently latched therein and which is applied, one with level inversion, to the 2's complementer associated with the other latching means, the 2's complementers functioning in response to only one of the two possible levels of the applied sign signal.

6. A demodulator as claimed in claim 5 characterized in that each sign signal is the most significant bit of the relevant latched count.

* * * * *